US010956335B2

(12) United States Patent
Tao et al.

(10) Patent No.: US 10,956,335 B2
(45) Date of Patent: Mar. 23, 2021

(54) NON-VOLATILE CACHE ACCESS USING RDMA

(71) Applicant: Oracle International Corporation, Redwood Shores, CA (US)

(72) Inventors: Zuoyu Tao, Belmont, CA (US); Jia Shi, Burlingame, CA (US); Kothanda Umamageswaran, Sunnyvale, CA (US); Juan R. Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/720,972

(22) Filed: Sep. 29, 2017

(65) Prior Publication Data

US 2019/0102309 A1 Apr. 4, 2019

(51) Int. Cl.
*G06F 12/0873* (2016.01)
*G06F 12/0864* (2016.01)
(Continued)

(52) U.S. Cl.
CPC ...... *G06F 12/0873* (2013.01); *G06F 12/0238* (2013.01); *G06F 12/0864* (2013.01);
(Continued)

(58) Field of Classification Search
CPC ............ G06F 12/0873; G06F 12/0238; G06F 12/0868; G06F 12/0871; G06F 15/17331; G06F 17/3033; G06F 17/3048
See application file for complete search history.

(56) References Cited

U.S. PATENT DOCUMENTS

| 4,425,615 A | 1/1984 | Swenson et al. |
| 4,881,166 A | 11/1989 | Thompson et al. |

(Continued)

FOREIGN PATENT DOCUMENTS

| EP | 0 501 180 A | 9/1992 |
| GB | 2409 301 A | 6/2005 |

(Continued)

OTHER PUBLICATIONS

Mitchell et al., "Using One-Sided RDMA Reads to Build a Fast, CPU-Efficient Key-Value Store," 2013, USENIX Association, 2013 USENIX Annual Technical Conference, p. 1 & 5 (Year: 2013).*

(Continued)

*Primary Examiner* — Andrew J Cheong
(74) *Attorney, Agent, or Firm* — Hickman Becker Bingham Ledesma LLP (57) ABSTRACT

Data blocks are cached in a persistent cache ("NV cache") allocated from as non-volatile RAM ("NVRAM"). The data blocks may be accessed in place in the NV cache of a "source" computing element by another "remote" computing element over a network using remote direct memory access ("RMDA"). In order for a remote computing element to access the data block in NV cache on a source computing element, the remote computing element needs the memory address of the data block within the NV cache. For this purpose, a hash table is stored and maintained in RAM on the source computing element. The hash table identifies the data blocks in the NV cache and specifies a location of the cached data block within the NV cache.

14 Claims, 6 Drawing Sheets

(51) Int. Cl.
*G06F 16/22* (2019.01)
*G06F 16/2455* (2019.01)
*G06F 12/02* (2006.01)
*G06F 12/0868* (2016.01)
*G06F 12/0871* (2016.01)
*G06F 15/173* (2006.01)

(52) U.S. Cl.
CPC ...... *G06F 12/0868* (2013.01); *G06F 12/0871* (2013.01); *G06F 15/17331* (2013.01); *G06F 16/2255* (2019.01); *G06F 16/24552* (2019.01); *G06F 2212/154* (2013.01); *G06F 2212/222* (2013.01); *G06F 2212/313* (2013.01)

(56) References Cited

U.S. PATENT DOCUMENTS

| | | |
|---|---|---|
| 5,095,421 A | 3/1992 | Freund |
| 5,241,675 A | 8/1993 | Sheth et al. |
| 5,263,156 A | 11/1993 | Bowen et al. |
| 5,287,496 A | 2/1994 | Chen et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,423,037 A | 6/1995 | Hvasshovd |
| 5,454,102 A | 9/1995 | Tang et al. |
| 5,553,279 A | 9/1996 | Goldring |
| 5,555,404 A | 9/1996 | Torbjørnsen et al. |
| 5,559,991 A | 9/1996 | Kanfi |
| 5,566,315 A | 10/1996 | Milillo et al. |
| 5,574,906 A | 11/1996 | Morris |
| 5,581,753 A | 12/1996 | Terry et al. |
| 5,603,024 A | 2/1997 | Goldring |
| 5,613,113 A | 3/1997 | Goldring |
| 5,649,156 A | 7/1997 | Vishlizky et al. |
| 5,717,893 A | 2/1998 | Mattson |
| 5,774,643 A | 6/1998 | Lubbers |
| 5,806,076 A | 9/1998 | Ngai et al. |
| 5,870,758 A | 2/1999 | Bamford et al. |
| 5,870,761 A | 2/1999 | Demers et al. |
| 5,893,086 A | 4/1999 | Schmuck |
| 5,924,096 A | 7/1999 | Draper et al. |
| 5,943,689 A | 8/1999 | Tamer |
| 5,951,695 A | 9/1999 | Kolovson |
| 5,953,719 A | 9/1999 | Kleewein |
| 5,956,731 A | 9/1999 | Bamford et al. |
| 5,974,427 A | 10/1999 | Reiter |
| 5,983,277 A | 11/1999 | Heile et al. |
| 5,991,771 A | 11/1999 | Falls et al. |
| 6,014,669 A | 1/2000 | Slaughter et al. |
| 6,122,630 A | 9/2000 | Strickler et al. |
| 6,192,377 B1 | 2/2001 | Ganesh et al. |
| 6,298,319 B1 | 10/2001 | Heile et al. |
| 6,353,835 B1 | 3/2002 | Lieuwen |
| 6,370,622 B1 | 4/2002 | Chiou et al. |
| 6,393,485 B1 | 5/2002 | Chao et al. |
| 6,457,105 B1 | 9/2002 | Spencer et al. |
| 6,516,327 B1 | 2/2003 | Zondervan et al. |
| 6,526,483 B1 | 2/2003 | Cho et al. |
| 6,574,717 B1 | 6/2003 | Ngai et al. |
| 6,611,898 B1 | 8/2003 | Slattery et al. |
| 6,691,139 B2 | 2/2004 | Ganesh et al. |
| 6,728,823 B1 | 4/2004 | Walker et al. |
| 6,839,751 B1 | 1/2005 | Dietz et al. |
| 6,922,754 B2 | 7/2005 | Liu et al. |
| 7,024,656 B1 | 4/2006 | Ahad |
| 7,031,994 B2 | 4/2006 | Lao et al. |
| 7,069,324 B1 | 6/2006 | Tiwana et al. |
| 7,076,508 B2 | 7/2006 | Brourbonnais et al. |
| 7,159,076 B2 | 1/2007 | Madter |
| 7,165,144 B2 | 1/2007 | Choubal et al. |
| 7,222,136 B1 | 5/2007 | Brown et al. |
| 7,287,034 B2 | 10/2007 | Wong et al. |
| 7,290,017 B1 | 10/2007 | Wang et al. |
| 7,290,090 B2 | 10/2007 | Madter |
| 7,415,723 B2 | 8/2008 | Pandya |
| 7,461,147 B1 | 12/2008 | Mowat et al. |
| 7,464,113 B1 | 12/2008 | Girkar et al. |
| 7,496,589 B1 | 2/2009 | Jain et al. |
| 7,506,103 B2 | 3/2009 | Madter |
| 7,548,898 B1 | 6/2009 | Tarenskeen et al. |
| 7,558,290 B1 | 7/2009 | Nucci |
| 7,570,451 B2 | 8/2009 | Bedillion et al. |
| 7,627,612 B2 | 12/2009 | Ahal et al. |
| 7,636,814 B1 | 12/2009 | Karr et al. |
| 7,644,084 B2 | 1/2010 | Rapp |
| 7,660,945 B1 | 2/2010 | Lee |
| 7,693,886 B1 | 4/2010 | Novick |
| 7,725,559 B2 | 5/2010 | Landis |
| 7,738,454 B1 * | 6/2010 | Panwar ............... H04L 45/745 365/49.17 |
| 7,769,802 B2 | 8/2010 | Smith |
| 7,774,568 B2 | 8/2010 | Sudhakar |
| 7,836,262 B2 | 11/2010 | Gunna et al. |
| 7,904,562 B2 | 3/2011 | Takase et al. |
| 7,912,051 B1 | 3/2011 | Rowlands et al. |
| 7,917,539 B1 | 3/2011 | Srinivasan |
| 7,921,686 B2 | 4/2011 | Bagepalli |
| 7,962,458 B2 | 6/2011 | Holenstein |
| 7,966,293 B1 | 6/2011 | Owara et al. |
| 8,145,838 B1 | 3/2012 | Miller et al. |
| 8,204,892 B2 | 6/2012 | Balebail et al. |
| 8,244,984 B1 | 8/2012 | Glasco et al. |
| 8,266,472 B2 | 9/2012 | Bose |
| 8,327,080 B1 | 12/2012 | Der |
| 8,359,429 B1 | 1/2013 | Sharma et al. |
| 8,370,452 B2 | 2/2013 | Harvell et al. |
| 8,521,923 B2 | 8/2013 | Lee et al. |
| 8,566,297 B1 | 10/2013 | Dowers |
| 8,627,136 B2 | 1/2014 | Shankar |
| 8,683,139 B2 | 3/2014 | Gaither |
| 8,706,687 B2 | 4/2014 | Fineberg |
| 8,832,142 B2 | 9/2014 | Marwah et al. |
| 8,868,831 B2 | 10/2014 | Goyal et al. |
| 9,003,159 B2 | 4/2015 | Deshkar |
| 9,075,710 B2 | 7/2015 | Talagala |
| 9,164,702 B1 | 10/2015 | Nesbit et al. |
| 9,256,542 B1 | 2/2016 | Flower |
| 9,263,102 B2 | 2/2016 | Flynn |
| 9,292,564 B2 | 3/2016 | Kamp et al. |
| 9,361,232 B2 | 6/2016 | Umamageswaran et al. |
| 9,405,694 B2 | 8/2016 | Goyal et al. |
| 9,448,901 B1 | 9/2016 | Aslam |
| 9,703,706 B2 | 7/2017 | Bagal et al. |
| 9,977,760 B1 | 5/2018 | Diehl |
| 10,133,667 B2 | 11/2018 | Mukherjee et al. |
| 10,148,548 B1 | 12/2018 | Griffin |
| 10,223,326 B2 | 3/2019 | Frank et al. |
| 10,311,154 B2 | 6/2019 | Lahiri et al. |
| 10,592,416 B2 | 3/2020 | Baddepudi et al. |
| 2002/0038384 A1 | 3/2002 | Khan |
| 2002/0059287 A1 | 5/2002 | Karasudani |
| 2002/0133508 A1 | 9/2002 | Larue et al. |
| 2002/0165724 A1 | 11/2002 | Bartus |
| 2003/0005223 A1 * | 1/2003 | Coulson ............... G06F 9/4401 711/118 |
| 2003/0046298 A1 | 3/2003 | Weedon |
| 2003/0115324 A1 | 6/2003 | Blumenau |
| 2003/0217236 A1 | 11/2003 | Rowlands |
| 2004/0054860 A1 | 3/2004 | Dixit |
| 2004/0073754 A1 | 4/2004 | Cypher |
| 2004/0117441 A1 | 6/2004 | Liu et al. |
| 2004/0122910 A1 | 6/2004 | Douglass et al. |
| 2004/0148486 A1 | 7/2004 | Burton |
| 2004/0193574 A1 | 9/2004 | Suzuki |
| 2004/0199552 A1 | 10/2004 | Ward et al. |
| 2004/0225719 A1 | 11/2004 | Kisley et al. |
| 2004/0225720 A1 | 11/2004 | Pinkerton |
| 2004/0225845 A1 | 11/2004 | Kruckemyer et al. |
| 2004/0230753 A1 | 11/2004 | Amiri |
| 2004/0254943 A1 | 12/2004 | Malcolm |
| 2005/0132017 A1 | 6/2005 | Biran et al. |

(56) References Cited

U.S. PATENT DOCUMENTS

| | | |
|---|---|---|
| 2005/0160224 A1 | 7/2005 | Cuomo et al. |
| 2005/0193160 A1 | 9/2005 | Bhatte et al. |
| 2005/0198062 A1 | 9/2005 | Shapiro |
| 2005/0210202 A1 | 9/2005 | Choubal et al. |
| 2006/0004691 A1 | 1/2006 | Sifry |
| 2006/0010130 A1 | 1/2006 | Leff et al. |
| 2006/0064441 A1 | 3/2006 | Yamamoto |
| 2006/0106890 A1 | 5/2006 | Paul et al. |
| 2006/0136570 A1 | 6/2006 | Pandya |
| 2006/0146814 A1 | 7/2006 | Shah et al. |
| 2006/0149786 A1 | 7/2006 | Nishiyama |
| 2006/0209444 A1 | 9/2006 | Song |
| 2006/0212481 A1 | 9/2006 | Stacey et al. |
| 2006/0218123 A1 | 9/2006 | Chowdhuri et al. |
| 2006/0271605 A1 | 11/2006 | Petruzzo |
| 2006/0271740 A1 | 11/2006 | Mark |
| 2007/0038689 A1 | 2/2007 | Shinkai |
| 2007/0006757 A1 | 3/2007 | Morris et al. |
| 2007/0067575 A1 | 3/2007 | Morris et al. |
| 2007/0078914 A1 | 4/2007 | Correl |
| 2007/0078940 A1 | 4/2007 | Fineberg et al. |
| 2007/0083505 A1 | 4/2007 | Ferrari et al. |
| 2007/0226277 A1 | 9/2007 | Holenstein et al. |
| 2007/0239790 A1 | 10/2007 | Cattell |
| 2007/0239791 A1 | 10/2007 | Cattell |
| 2007/0239797 A1 | 10/2007 | Cattell |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0098044 A1 | 4/2008 | Todd |
| 2008/0104329 A1 | 5/2008 | Gaither et al. |
| 2008/0155303 A1 | 6/2008 | Toeroe |
| 2008/0177803 A1 | 7/2008 | Fineberg et al. |
| 2008/0209009 A1 | 8/2008 | Katwala et al. |
| 2008/0215580 A1 | 9/2008 | Altinel et al. |
| 2008/0219575 A1 | 9/2008 | Wittenstein |
| 2008/0222136 A1 | 9/2008 | Yates |
| 2008/0222159 A1 | 9/2008 | Aranha et al. |
| 2008/0235479 A1 | 9/2008 | Scales |
| 2008/0222111 A1 | 12/2008 | Hoang et al. |
| 2009/0030911 A1 | 1/2009 | Guo |
| 2009/0138944 A1 | 5/2009 | Rajasekaran |
| 2009/0164536 A1 | 6/2009 | Nasre et al. |
| 2009/0171679 A1 | 7/2009 | Salgado et al. |
| 2009/0182960 A1 | 7/2009 | Crockett |
| 2009/0193189 A1 | 7/2009 | Carswell et al. |
| 2009/0235230 A1 | 9/2009 | Lucas |
| 2009/0240664 A1 | 9/2009 | Dinker |
| 2009/0248871 A1 | 10/2009 | Takase et al. |
| 2009/0276479 A1 | 11/2009 | Lucas |
| 2009/0287737 A1 | 11/2009 | Hammerly |
| 2009/0292861 A1 | 11/2009 | Kanevsky |
| 2009/0313311 A1 | 12/2009 | Hoffmann |
| 2010/0017556 A1 | 1/2010 | Chin et al. |
| 2010/0036843 A1 | 2/2010 | MacNaughton et al. |
| 2010/0042587 A1 | 2/2010 | Johnson |
| 2010/0070448 A1 | 3/2010 | Omoigui |
| 2010/0095059 A1 | 4/2010 | Kisley et al. |
| 2010/0122026 A1 | 5/2010 | Umamageswaran et al. |
| 2010/0145909 A1 | 6/2010 | Ngo |
| 2010/0158486 A1 | 6/2010 | Moon |
| 2010/0199042 A1 | 8/2010 | Bates |
| 2010/0205367 A1 | 8/2010 | Ehrlich |
| 2010/0274962 A1 | 10/2010 | Moesk |
| 2010/0278446 A1 | 11/2010 | Ganesh et al. |
| 2010/0306234 A1 | 12/2010 | Wang et al. |
| 2010/0332654 A1 | 12/2010 | Bose |
| 2011/0022801 A1 | 1/2011 | Flynn |
| 2011/0029569 A1 | 2/2011 | Ganesh et al. |
| 2011/0040861 A1 | 2/2011 | Van der Merwe |
| 2011/0041006 A1 | 2/2011 | Flower |
| 2011/0047330 A1 | 2/2011 | Potapov |
| 2011/0071981 A1 | 3/2011 | Ghosh |
| 2011/0072217 A1 | 3/2011 | Hoang |
| 2011/0087637 A1 | 4/2011 | Sundaram et al. |
| 2011/0137861 A1 | 6/2011 | Burnett |
| 2011/0153719 A1 | 6/2011 | Santoro |
| 2011/0173325 A1 | 7/2011 | Cherian et al. |
| 2011/0191522 A1 | 8/2011 | Condict |
| 2011/0191543 A1 | 8/2011 | Craske et al. |
| 2011/0238899 A1 | 9/2011 | Yano |
| 2011/0258376 A1 | 10/2011 | Young |
| 2011/0320804 A1 | 12/2011 | Chan et al. |
| 2012/0013758 A1 | 1/2012 | Frederiksen |
| 2012/0017037 A1* | 1/2012 | Riddle ............ G06F 16/24569 711/103 |
| 2012/0054225 A1 | 3/2012 | Marwah |
| 2012/0054533 A1 | 3/2012 | Shi et al. |
| 2012/0063533 A1 | 3/2012 | Fonseka |
| 2012/0158650 A1 | 6/2012 | Andre |
| 2012/0158729 A1 | 6/2012 | Mital |
| 2012/0166729 A1 | 6/2012 | Donley |
| 2012/0173844 A1 | 7/2012 | Punde et al. |
| 2012/0221788 A1 | 8/2012 | Raghunathan |
| 2012/0246202 A1 | 9/2012 | Surtani |
| 2012/0265743 A1 | 10/2012 | Ivanova |
| 2012/0290786 A1 | 11/2012 | Mesnier |
| 2012/0296883 A1 | 11/2012 | Ganesh |
| 2012/0323849 A1 | 12/2012 | Garin et al. |
| 2012/0323970 A1 | 12/2012 | Larson |
| 2012/0331243 A1 | 12/2012 | Aho |
| 2013/0007180 A1 | 1/2013 | Talpey et al. |
| 2013/0019000 A1 | 1/2013 | Markus |
| 2013/0024433 A1 | 1/2013 | Amit |
| 2013/0066949 A1 | 3/2013 | Colrain |
| 2013/0132684 A1 | 5/2013 | Ostrovsky |
| 2013/0132705 A1 | 5/2013 | Ishii |
| 2013/0166534 A1 | 6/2013 | Yoon |
| 2013/0166553 A1 | 6/2013 | Yoon |
| 2013/0198312 A1 | 8/2013 | Tamir et al. |
| 2013/0212332 A1 | 8/2013 | Umamageswaran |
| 2013/0262613 A1 | 10/2013 | Hefty |
| 2013/0275391 A1* | 10/2013 | Batwara ............ G06F 17/30085 707/689 |
| 2013/0290598 A1 | 10/2013 | Fiske |
| 2013/0326152 A1 | 12/2013 | Loaiza et al. |
| 2014/0012814 A1 | 1/2014 | Bercovici |
| 2014/0047263 A1 | 2/2014 | Coathney |
| 2014/0089565 A1 | 3/2014 | Lee |
| 2014/0010842 A1 | 4/2014 | Isaacson |
| 2014/0108421 A1 | 4/2014 | Isaacson et al. |
| 2014/0108751 A1 | 4/2014 | Brown |
| 2014/0143364 A1* | 5/2014 | Guerin ............ G06F 15/17331 709/212 |
| 2014/0149638 A1 | 5/2014 | Jain |
| 2014/0189032 A1 | 7/2014 | Sugimoto |
| 2014/0200166 A1 | 7/2014 | Van Rooyen |
| 2014/0281167 A1 | 9/2014 | Danilak |
| 2014/0281272 A1 | 9/2014 | Loaiza et al. |
| 2014/0304353 A1 | 10/2014 | Evans |
| 2014/0325115 A1 | 10/2014 | Ramsundar |
| 2014/0337593 A1 | 11/2014 | Holbrook |
| 2014/0372486 A1 | 12/2014 | Bose |
| 2014/0372489 A1 | 12/2014 | Jaiswal |
| 2014/0372702 A1 | 12/2014 | Subramanyam |
| 2015/0006482 A1 | 1/2015 | Hardy |
| 2015/0006813 A1 | 1/2015 | Goyal et al. |
| 2015/0012690 A1 | 1/2015 | Bruce |
| 2015/0012735 A1 | 1/2015 | Tamir et al. |
| 2015/0019834 A1 | 1/2015 | Loh |
| 2015/0039712 A1 | 2/2015 | Frank et al. |
| 2015/0067087 A1 | 3/2015 | Guerin |
| 2015/0067088 A1 | 3/2015 | Guerin |
| 2015/0088811 A1 | 3/2015 | Hase et al. |
| 2015/0088822 A1 | 3/2015 | Raja |
| 2015/0088824 A1 | 3/2015 | Kamp et al. |
| 2015/0088830 A1 | 3/2015 | Kamp et al. |
| 2015/0088926 A1 | 3/2015 | Chavan |
| 2015/0089121 A1 | 3/2015 | Coudhury et al. |
| 2015/0089125 A1 | 3/2015 | Mukherjee et al. |
| 2015/0089134 A1 | 3/2015 | Mukherjee |
| 2015/0089138 A1 | 3/2015 | Tao et al. |
| 2015/0089140 A1 | 3/2015 | Sridharan |
| 2015/0150017 A1 | 5/2015 | Hu |

(56) References Cited

U.S. PATENT DOCUMENTS

| | | | |
|---|---|---|---|
| 2015/0187430 A1 | 7/2015 | Suzuki | |
| 2015/0317349 A1 | 11/2015 | Chao | |
| 2016/0026579 A1 | 1/2016 | Samanta | |
| 2016/0026605 A1 | 1/2016 | Pandit | |
| 2016/0028819 A1 | 1/2016 | Schultz | |
| 2016/0103767 A1 | 4/2016 | Banerjee et al. | |
| 2016/0127494 A1* | 5/2016 | Liu | H04L 67/2842 709/212 |
| 2016/0132411 A1 | 5/2016 | Jolad et al. | |
| 2016/0188414 A1 | 6/2016 | Jayakumar | |
| 2016/0188527 A1 | 6/2016 | Cherian | |
| 2016/0283159 A1* | 9/2016 | Gopal | G06F 3/0638 |
| 2016/0306574 A1 | 10/2016 | Friedman | |
| 2016/0306923 A1 | 10/2016 | Van Rooyen | |
| 2016/0308968 A1 | 10/2016 | Friedman | |
| 2016/0328301 A1 | 11/2016 | Parakh et al. | |
| 2016/0335310 A1 | 11/2016 | Lahiri et al. | |
| 2016/0371347 A1 | 12/2016 | Aronovich | |
| 2017/0034270 A1 | 2/2017 | Nagasubramaniam | |
| 2017/0075856 A1 | 3/2017 | Suzue | |
| 2017/0091246 A1 | 3/2017 | Risvik | |
| 2017/0103039 A1 | 4/2017 | Shamis | |
| 2017/0109317 A1 | 4/2017 | Hack et al. | |
| 2017/0124021 A1 | 5/2017 | Brown | |
| 2017/0147507 A1 | 5/2017 | Horii | |
| 2017/0149890 A1 | 5/2017 | Shamis | |
| 2017/0149924 A1 | 5/2017 | Peterson | |
| 2017/0177488 A1 | 6/2017 | Leung | |
| 2017/0269837 A1 | 9/2017 | Stevens | |
| 2017/0277655 A1 | 9/2017 | Das | |
| 2017/0300592 A1 | 10/2017 | Breslow | |
| 2017/0357611 A1 | 12/2017 | Cherian | |
| 2018/0096049 A1 | 4/2018 | Kondiles | |
| 2018/0316760 A1 | 11/2018 | Chernin | |
| 2018/0321846 A1 | 11/2018 | Zhang | |
| 2018/0341596 A1 | 11/2018 | Teotia | |
| 2018/0341653 A1 | 11/2018 | Teotia | |
| 2019/0187916 A1 | 6/2019 | Romem | |

FOREIGN PATENT DOCUMENTS

| | | |
|---|---|---|
| WO | WO 93/18461 | 9/1993 |
| WO | WO 2007/045839 A2 | 4/2007 |
| WO | WO2007/045839 A2 | 4/2007 |
| WO | WO2013/109640 A1 | 7/2013 |
| WO | WO 2015/094179 A1 | 6/2015 |

OTHER PUBLICATIONS

Ailamaki, Anastassia, et al, "Weaving Relations for Cache Performance," Proceedings of the $27^{th}$ International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright ©2000, ISBN-0-8053-1755-4, pp. 32, 70, 118, 131-132, 134, 155-159, 170, 252-254, 558, 569-573, 591-592, and 789-790 (26 pgs).
Hilland et al., "RDMA Protocol Verbs Specification" Version 1.0), dated Apr. 25, 2003, 243 pages.
Culley P. et al., "An RDMA Protocol Specification" Internet Draft, dated Sep. 16, 2002, 58 pages.
Microsoft, "Database Instant File Initialization", SQL Server 2016, https://msdn.microsoft.com/en-us/library/ms175935.aspx, 3 pages.
Aronovich et al., "The Design of a Similarity Based Deduplication System", Systor, 2009, 14 pages.
Forman et al., "Efficient Detection of Large-Scale Redundancy in Enterprise File Systems", dated Jan. 2009, 8 pages.
Bober, Paul M., et al., "On Mixing Queries and Transactions via Multiversion Locking", Computer Sciences Department, University of Wisconsin, 1992, pp. 535-545.
Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.

Harder Theo et al., "Database Caching—Towards a Cost Model for Populating Cache Groups," ADBIS 2004, LNCS 3255, A. Benczur, J. Demetrovics, 15 pages.
Oracle, Oracle Times Ten In-Memory Database API and SQI Reference Guide, Release 6.0, dated 2006, 37 pages.
Teschke et al., "Concurrent Warehouse Maintenance Without Comprising Session Consistency", University of Erlangen-Nuremberg., Pub 1998, 10 pages.
Vassilakis et al., "Implementation of Transaction and Concurrency Control Support in a Temporal DBMS", Department of Information Systems, University of Athens, vol. 23 No. 5. Pub 1998, 16 pages.
Oracle®, "TimesTen to TimesTen Replication Guide" Release 7.0, B31684-03, Sep. 2007. http://download.oracle.com/otn_hosted_doc/timesten/703/TimesTen-Documentation/replication.pdf.
Oracle®, "TimesTen to TimesTen In-Memory Database Introduction" Release 7.0, B31687-03, Sep. 2007. http://download.oracle.com/otn_hosted_doc/timesten/703/TimesTen-Documentation/intro.pdf.
Oracle® Clusterware, Administration and Deployment Guide, 1 1g Release 1 (11.1), B28255-06, Oct. 2008. http://download.oracle.com/docs/cd/B28359_01/rac.111/b28255.pdf.
The Times Ten Team, Mid-Tier Caching: The Times Ten Approach, Jun. 2002. ACM SIGMOD, 6 pages.
Bornhovd et al., "Adaptive Database Caching with DBCache", IEEE 2004, pp. 11-18.
The TimesTen Team, "High Performance and Scalability through Application-Tier, In-Memory Management", Proceedings of $26^{th}$ International Conference on Very Large Databases, Cairo, Egypt, 2000, pp. 677-680.
Anonymous: "Transaction Handling", dated Jan. 1, 2002, https://docs.oracle.com/cd/A87860_01/doc/java.817/a83725/trans1.htm, 12 pages.
Anonymous: "Chapter 6 Handling" Transactions with Enterprise Beans, dated Jan. 1, 2004, https://docs.oracle.com/cd/E19229-01/819-1644/detrans.html, 16 pages.
Muhkherjee, U.S. Appl. No. 15/257,754, filed Sep. 6, 2016, Corrected Notice of Allowance, dated Aug. 28, 2018.
Loaiza, U.S. Appl. No. 15/693,273, filed Aug. 31, 2017, Office Action, dated Oct. 2, 2018.
Wang et al., "C-Hint: An Effective and Reliable Cache Management for RDMA-Accelerated Key-Value Stores", dated 2014, 2 pages.
Mitchell et al., "Using One-Sides RDMA Reads to Build a Fast, CPU-Efficient Key-Value Store", 12 pages.
Fan et al., "MemC3: Compact and Concurrent MemCache With Dumber Caching and Smarter Hashing", NSDI'13, dated Apr. 2013, 14 pages.
Feng et al., "Accelerating Relational Databases by Leveraging Remote Memory and RDMA", Proceedings of the 2016 International Conference on Management of Data, SIGMOD, Jan. 1, 2016, pp. 355-370.
Lahiri, U.S. Appl. No. 14/709,018, filed May 11, 2015, Final Office Action, dated Jul. 12, 2018.
Muhkherjee et al., U.S. Appl. No. 15/257,754, filed Sep. 6, 2016, Office Action, dated Nov. 16, 2017.
Lahiri, U.S. Appl. No. 14/709,018, filed May 11, 2015, Office Action, dated Oct. 18, 2017.
Lahiri, U.S. Appl. No. 14/709,018, filed May 11, 2015, Interview Summary, dated Jul. 3, 2019.
Tyler Szepesi, et al. "Nessie: A Decoupled, Client-Driven, Key-Value Store using RDMA", Copyright 2015 the authors CS-2015-09, 13 pages.
Szepesi, Tyler, et al. "Designing a low-latency cuckoo hash table for write-intensive workloads using RDMA." First International Workshop on Rack-scale Computing. 2014, 6 pages.
Mitchell et al., "Using One-Sides RDMA Reads to Build a Fast, CPU-Efficient Key-Value Store" dated 2013, 12 pages.
Mitchell et al., "Using One-Sided RDMA Reads to Build a Fast, CPU-Efficient Key-Value Store", 2013 USENIX Annual Technical Conference (USENIX ATC '13), 12 pages.
Kalia et al., "Using RDMA Efficiently for Key-Value Services", SIGCOMM'14, Aug. 17-22, 2014, Chicago, IL, USA, 15 pages.
Kalia et al., "Using RDMA efficiently for key-value services", dated 2014, 2 pages.

(56) References Cited

OTHER PUBLICATIONS

Kalia et al., "Using RDMA Efficiently for Key-Value Services", ACM SIGVOMM, https://www.researchgate.net/publication/266659972_Using_RDMA_Eff, 5 pages, Aug. 2014.

Dragojević, et al., "FaRM: Fast Remote Memory", https://www.usenix.org/conference/nsdi14/technical-sessions/dragojević, dated Apr. 2014, 15 pages.

Mciyyappan, U.S. Appl. No. 15/721,328, filed Sep. 29, 2017, Notice of Allowance, dated Jun. 15, 2020.

Lahiri, U.S. Appl. No. 14/709,018, filed May 11, 2015, Office Action, dated May 26, 2020.

Choudhury, U.S. Appl. No. 15/720,959, filed Sep. 29, 2017, Notice of Allowance, dated Apr. 15, 2020.

Shi, U.S. Appl. No. 15/720,949, filed 09/269/2017, Notice of Allowance, dated Mar. 25, 2020.

Teotia, U.S. Appl. No. 15/606,322, filed May 26, 2017, Notice of Allowance, dated Mar. 4, 2020.

Pavlo, Andy, "15-721 Database Systems", Lecture #23 Non-Volatile Memory, dated Spring 2016, 70 pages.

Shi, U.S. Appl. No. 15/720,949, filed Sep. 29, 2017, Office Action, dated Oct. 4, 2019.

Rest, U.S. Appl. No. 15/409,091, filed Jan. 18, 2017, Notice of Allowance, dated May 14, 2019.

Lahiri, U.S. Appl. No. 14/709,018, filed May 11, 2015, Office Action, dated Apr. 22, 2019.

Teotia, U.S. Appl. No. 15/606,322, filed May 26, 2017, Office Action, dated Mar. 22, 2019.

Teotia, U.S. Appl. No. 15/606,322, filed May 26, 2017, Office Action, dated Oct. 21, 2019.

Choudhury, U.S. Appl. No. 15/720,959, filed Sep. 29, 2017, Office Action, dated Oct. 4, 2019.

\* cited by examiner

FIG. 1

NV Hash Table 129-1 "Hash key is Home Location of Data Block"

| | 204-1 | 204-2 | 204-3 | | 204-N |
|---|---|---|---|---|---|
| 202-1 | Home Loc. / Cache Loc. / Valid | Home Loc. / Cache Loc. / Valid | Home Loc. / Cache Loc. / Valid | ... | Home Loc. / Cache Loc. / Valid |
| 202-2 | Home Loc. / Cache Loc. / Valid | Home Loc. / Cache Loc. / Valid | Home Loc. / Cache Loc. / Valid | ... | |
| 202-3 | Home Loc. / Cache Loc. / Valid | Home Loc. / Cache Loc. / Valid | Home Loc. / Cache Loc. / Valid | ... | |
| 202-N | Home Loc. / Cache Loc. / Valid | Home Loc. / Cache Loc. / Valid | | ... | Home Loc. / Cache Loc. / Valid |

NON-VOLATILE CACHE ACCESS USING RDMA

RELATED APPLICATIONS

The present application is related to U.S. Patent Application entitled REMOTE ONE-SIDED PERSISTENT WRITES, filed by Jia Shi, et al., on the equal day herewith, having Ser. No. 15/720,949, the entire contents of which are incorporated herein by reference.

The present application is related to U.S. Patent Application entitled DATABASE WITH NVDIMM AS PERSISTENT STORAGE, filed by Nilesh Choudhury, et al., on the equal day herewith, having Ser. No. 15/720,959, the entire contents of which are incorporated herein by reference.

The present application is related to U.S. Patent Application entitled STORING DERIVED SUMMARIES ON PERSISTENT MEMORY OF A STORAGE DEVICE, filed by Yiliang Jin, et al., on the equal day herewith, having Ser. No. 15/721,328, the entire contents of which are incorporated herein by reference.

TECHNICAL FIELD

The present disclosure relates to database systems. More specifically, the disclosure relates to caching database data in persistent caches.

BACKGROUND

Computing elements, such as work stations or server blades, may request data blocks from other "source" computing elements over a network. The source computing elements may use a persistent cache (e.g. cache in flash memory) to cache copies of the data blocks that are primarily stored in primary persistent storage (e.g. disk storage).

Persistent caches are generally faster and smaller than primary storage. If a copy of a data block is stored in the persistent cache when a request for that data block is received, the data block can be returned far more quickly from the persistent cache than from primary storage.

Even though a copy of the requested data block is stored in faster persistent cache, a copy of the data block may be first staged to volatile random access memory (volatile "RAM") before returning the data block over the network to the requesting computing element. From volatile RAM, the copy of the data block is transmitted over the network to the requesting computing element. The operation of writing a data block from a persistent storage (e.g. persistent cache, primary storage) to volatile RAM to stage the data block for transmission over a network to a computing element requesting the data block is referred to herein as read staging.

For example, a source computing element may be a networked enabled block mode storage device that uses a persistent cache. Another computing element, referred to herein as a storage device client of the storage device, is connected to the storage device via a network. To read a data block, a data block read operation is initiated by the storage device client. To initiate a data block read operation, the storage device client transmits a request for the data block to the storage device. When the request is received, there is no copy of the data block in the persistent cache. The storage device performs read staging so that the data block may be transmitted to the storage device client. The copy of the data block is transmitted from volatile RAM over the network to the storage device client. The storage device also adds the copy to the persistent cache so that subsequent requests for the data block received in the future may be satisfied by the copy in the persistent cache. While the data block is stored in the persistent cache, another request for the data block is received from a storage device client. Before transmitting the data block to the storage device client, read staging is performed by copying the data block in persistent storage to volatile RAM. Once the data block is staged in volatile RAM, the data block is transmitted to the storage device client.

As another example, a clustered database system may comprise database servers running on networked computing elements, each database server running on a respective computing element. The database servers service the same database and each uses a persistent cache to temporarily store copies of data blocks from the database. A copy of a data block may be stored in a persistent cache of a database server when another database server may request the data block from the database server. To transmit the data block from a persistent cache of the database server storing the copy, the database server performs read staging to volatile RAM, copying the data block from the persistent cache to volatile RAM. A copy of the data block is then transmitted from the volatile RAM to the other database server.

The performance of systems comprising computing elements that receive over a network data blocks from other computing elements that cache the data block in persistent caches depends on the efficiency and speed of transmitting the data blocks from persistent cache over a network to computing elements requesting the data blocks. Described herein are approaches for furnishing copies of data blocks from persistent cache over a network.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details.

General Overview

Described herein are novel techniques for accessing data blocks over a network that are cached in a persistent cache. The techniques make use of a form of persistent byte addressable memory referred to herein as non-volatile RAM ("NVRAM"). Data blocks are cached in a pool of buffers allocated from NVRAM, a pool of buffers allocated from NVRAM being referred to herein as a NV cache. The data blocks may be accessed in place in the NV cache of a "source" computing element by another "remote" computing element over a network using remote direct memory access ("RDMA"). Transmitting a data block in this way avoids overhead attendant to performing read staging in order to transmit the data block over the network. These techniques are referred to herein as NV caching.

Under NV caching, in order for a remote computing element to access the data block in NV cache on a source computing element, the remote computing element needs the memory address of the data block within the NV cache. For this purpose, a hash table is stored and maintained in RAM (volatile or non-volatile) on the source computing element. The hash table identifies the data blocks in the NV cache and specifies a location of the cached data block within the NV cache.

Importantly, the hash table is RDMA accessible, that is, the hash table is at location in RAM (volatile or NVRAM) that is accessible by remote computing elements using RDMA. Through RDMA reads of the hash table, the remote computing element can determine the existence and location of a data block within the NV cache.

Illustrative DBMS

NV caching is illustrated in the context of a DBMS. A DBMS comprises at least one database server. The database server is hosted on at least one computing element and may store database data in block mode storage devices. The block mode storage devices may be one or more disk drives and flash drives connected via a high speed bus of the computing element to the one or more hardware processors ("processors") of the computing element and/or memory of the computing element. A block mode storage device may also be a network enabled storage device that is connected via a network to the computing element and that compromises other block mode storage devices such as disk drives and flash drives.

More powerful DBMSs are hosted on a parallel processor hardware platform. Such DBMSs are referred to herein as multi-node DBMSs. A multi-node DBMS comprises multiple computing elements referred to herein as computing nodes. Each computing node comprises a hardware processor or multiple hardware processors that each share access to the same main memory.

Figure 1:
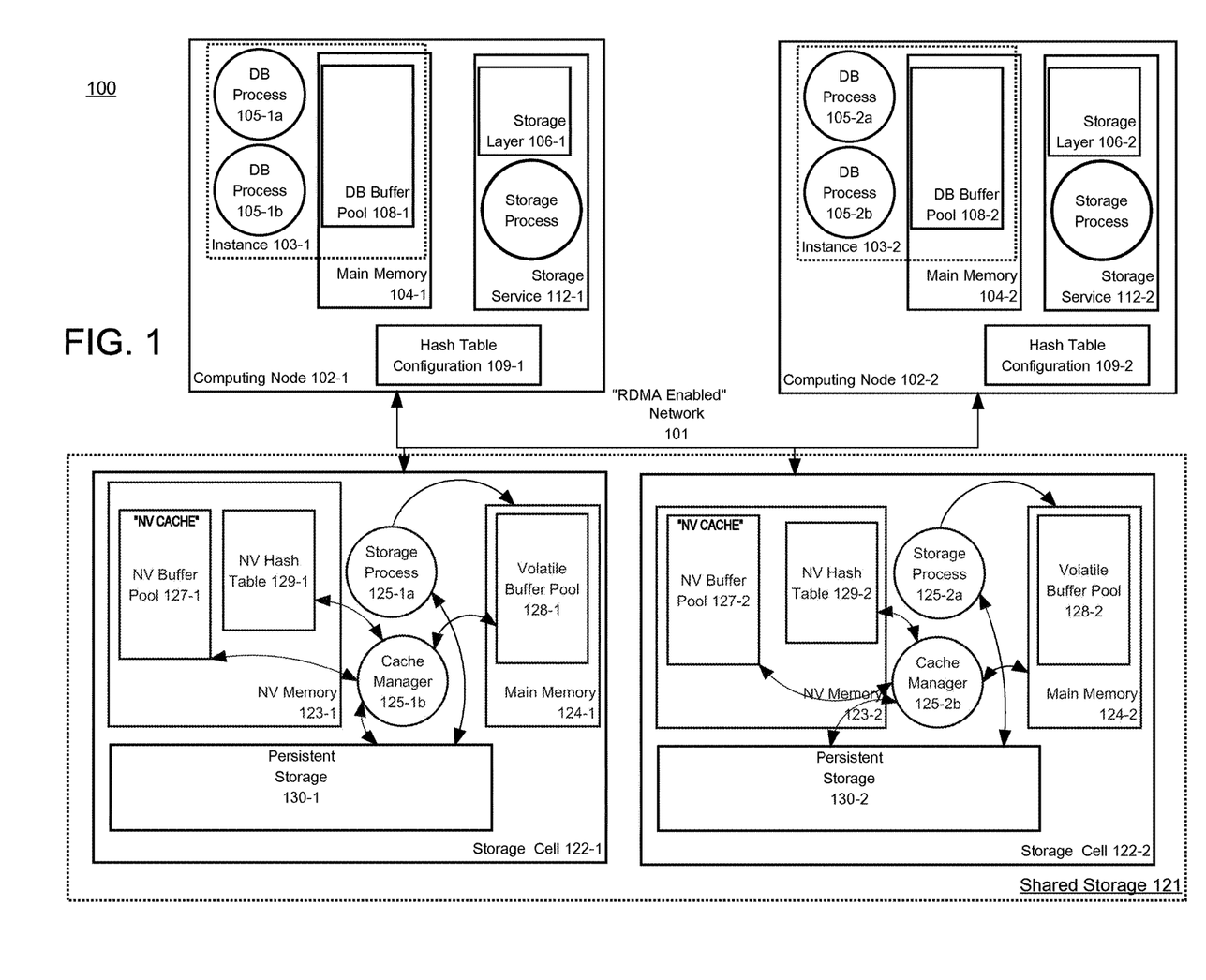
FIG. 1 illustrates a DBMS using a cache allocated from non-volatile memory according to an embodiment of the present invention.

FIG. 1 is a block diagram that illustrates a multi-node DBMS. Referring to FIG. 1, multi-node DBMS 100 comprises database server instances, each hosted on a respective computing node, each database server instance providing access to the same database stored on shared storage 121. The database server instances of DBMS 100 comprise database server instances 103-1 and 103-2, which are hosted on computing nodes 102-1 and 102-2 respectively. The shared storage 121 comprises storage cells 122-1 and 122-2. Each of database server instances 103-1 and 103-2 is connected by a high speed network 101 to each of storage cells 122-1 and 122-2.

Each of storage cells 122-1 and 122-2 is a computing element that includes persistent storage (e.g. disk, flash memory) for storing "database files" of the one or more databases of DBMS 100. Storage cell 122-1 includes persistent storage 130-1 and main memory 124-1 and storage cell 122-2 includes persistent storage 130-2 and main memory 124-2. Main memory 124-1 and main memory 124-2 are volatile RAMs. Persistent storage 130-1 and persistent storage 129-1 may comprise persistent storage devices such as disk devices or flash memory devices.

One or more storage processes running on each of storage cells 122-1 and 122-2, such as storage process 125-1*a* and storage process 125-2*a*, receive requests from any of database server instances 103-1 and 103-2 to read or write data blocks from or to database files stored in persistent storage.

Volatile buffer pool 128-1 and volatile buffer pool 128-2 are buffer pools allocated from main memory 124-1 and main memory 124-2, respectively. Volatile buffer pool 128-1 and volatile buffer pool 128-2 each comprises buffers and each is used for temporarily staging and/or caching of data blocks stored in persistent storage 130-1 and persistent storage 130-2, respectively. Volatile buffer pool 128-1 and volatile buffer pool 128-2 may be each referred to herein as a volatile cache.

Storage cells 122-1 and 122-2 also include non-volatile RAM memories NV memory 123-1 and NV memory 123-2, respectively. NV buffer pool 127-1 and NV buffer pool 127-2 are buffer pools allocated from NV memory 123-1 and NV memory 123-2, respectively. NV buffer pool 127-1 and NV buffer pool 127-2 each comprises buffers that are being used for temporarily staging and/or caching data blocks from persistent storage 130-1 and 130-2, respectively. NV buffer pool 127-1 and NV buffer pool 127-2 may each be referred to herein as a NV cache.

Once a data block is added to a NV cache and/or volatile cache, the data block may be cached or otherwise retained in the NV cache or volatile cache to satisfy subsequent read requests for data blocks. Eventually, a cached data block must be removed from a NV cache and/or volatile cache to make room for another data block. To select and remove a data block to make room for another, various cache management policies and techniques may be used, such as Least Recently Used algorithms. Cache manager 125-1*b* is a process responsible for performing cache management of NV buffer pool 127-1 and volatile buffer pool 128-1 and cache manager 125-2*b* is a process for performing cache management of NV buffer pool 127-2 and volatile buffer pool 128-2.

Database Server Instances

Each of the database server instances of DBMS 100 comprise database processes that run on the computing node that hosts the database server instance. A database process may be, without limitation, a process running within a database session that executes database commands issued within the database session or a query execution process belonging to a pool of processes that is assigned to execute queries issued through database sessions.

Referring to FIG. 1, each of database server instances 103-1 and 103-2 comprise multiple database processes and database buffers that cache data blocks read from shared storage 121. Database server instances 103-1 and 103-2 are hosted on computing nodes 102-1 and 102-2, respectively. Database server instance 103-1 comprises DB processes 105-1*a* and 105-1*b*, which run on computing node 102-1, and database buffer pool 108-1, which is allocated from main memory 104-1. Database server instance 103-2 comprises database processes 105-2*a* and 105-2*b*, which run on computing node 102-2, and database buffer pool 108-2, which is allocated from main memory 104-2.

RDMA

Network 101 is RDMA enabled, enabling a process running a computing node 102-1 or computing node 102-2 to read and write from or to NV memory 123-1, NV memory 123-2, main memory 124-1 and main memory 124-2 using RDMA. In RDMA, the direct transfer of data occurs through a RDMA mechanism on each of the computing elements. According to an embodiment, the RDMA mechanism comprises a network interface hardware controller that is RDMA capable (RNIC) on each of the computing elements. A process running on a hardware processor (e.g. general purpose CPU) of an "initiating" computing element may issue a RDMA read request to a "local" RNIC on the initiating computing element to read data stored at a "remote" memory address in the "remote" RAM of a "remote" computing element and write the data to a "local" memory address within "local" RAM on the initiating computing element. In response to receiving the RDMA read request, the local RNIC and the remote RNIC transfer data from the remote RAM to the local RAM. The remote RNIC reads data at the remote memory address, transmits the data over the RDMA enabled network to the local RNIC, which writes the data to the local RAM at the local memory address. No hardware processor (e.g. general purpose CPU) that is not part of the local RNIC and remote RNIC participates in reading the data from the remote RAM, transmitting the data over the RDMA enabled network, and writing the data to the local RAM.

Once the transfer of the data is completed, the local RNIC signals that the transfer of the data has been completed. The process initiating the request or another process may then access the transferred data at the local memory address.

Storage Services

To initiate a data block read operation for a data block from a block enabled storage device, a database process running within a database server instance needs to determine the home storage location ("home location") of the data block within the persistent storage of the storage device, such as the block address within a flash memory or a disk offset on a particular disk. To make this determination, a DBMS maintains mapping data within a data dictionary that specifies which database files hold data blocks for which database tables, and uses a storage service that maps database files and offsets within the database files to home locations in persistent storage. The term "home location" refers to the storage location of a data block in persistent storage and not to the storage location or address within a NV cache or other buffer pool that is used to temporarily cache data blocks from the persistent storage. Each database server instance of DBMS 100 may store a copy of the mapping data within volatile RAM for quick access.

For example, a data block is stored on a disk in a storage cell. To determine the home location of the data block, the database process uses the storage service to determine the home location that corresponds to a database file offset of the data block. The home location may be an offset on a particular disk or block address within a particular flash memory device.

According to an embodiment, each computing node of DBMS 100 hosts a storage service. Referring to FIG. 1, computing node 102-1 hosts storage service 112-1. Storage service 112-1 comprises one or more storage processes and storage layer 106-1. A storage layer includes software and associated storage metadata that describes how database files are stored on various storage devices, such as disks and flash memory. The storage layer software is executed by storage processes and/or by database processes. Storage processes monitor and manage storage of database files within DBMS 100. Similarly, computing node 102-2 hosts storage service 112-2, which comprises one or more storage processes and storage layer 106-2.

An important function of storage service 112-1 is to provide a mapping between database files and offsets therein to home locations in storage devices. To determine the home location that corresponds to an offset within a database file, a database process invokes a function of storage layer 106-1, passing in the identity of the database file and the offset; the function returns the home location, which may identify a particular disk and offset or flash memory address and block address.

NV Hash Table

As indicated previously, under NV caching, to access a data block in a NV cache on a remote computing element using RDMA, the memory address of the data block is obtained using RDMA from a hash table stored in the NV cache of the remote computing element. Such a hash table is referred to herein as a NV hash table. An embodiment of a NV hash table is depicted in FIG. 1, and in FIG. 2 in greater detail.

Referring to FIG. 1, storage cell 122-1 stores NV hash table 129-1 in NV memory 123-1 and storage cell 122-2 stores NV hash table 129-2 in NV memory 123-2. NV hash table 129-1 identifies cached data blocks stored in NV buffer pool 127-1 and specifies the storage location within NV buffer pool 127-1 ("cache location") of each cached data block in NV buffer pool 127-1. NV hash table 129-2 identifies cached data blocks stored in NV buffer pool 127-2 and specifies the cache location within NV buffer pool 127-2 of each cached data block in NV buffer pool 127-2. A cache location may be a memory address of a buffer within NV buffer pool 127-1 or NV buffer pool 127-2, or an offset from a base memory address of NV buffer pool 127-1 or NV buffer pool 127-2. The base memory address of a data structure is the memory address of the beginning of the region of memory at which a data structure is stored.

Figure 2:
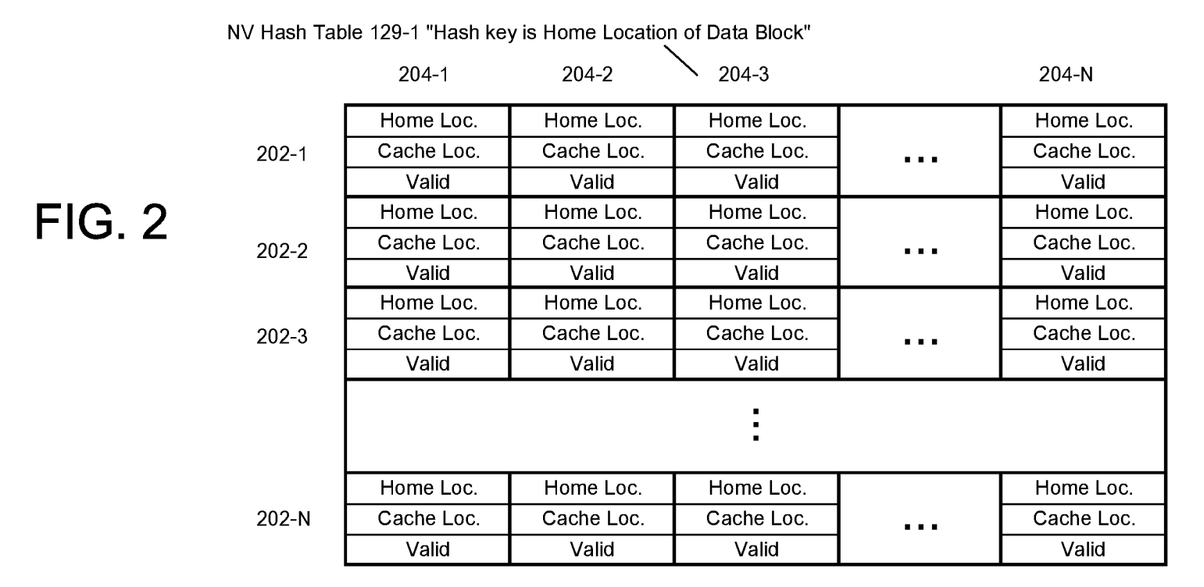
FIG. 2 illustrates a hash table storing data describing caching of data blocks from non-volatile memory according to an embodiment of the present invention.

FIG. 2 shows the structure of a NV hash table according to an embodiment of present invention. The structure is described with reference to NV hash table 129-1.

Referring to FIG. 2, NV hash table 129-1 includes hash table buckets 202-1, 202-2, 202-3 through 202-N. According to an embodiment, each hash table bucket comprises an array of elements that is stored contiguously (within a memory address space) of NV memory 123-1. For example, hash table bucket 202-1 comprises elements 204-1, 204-2, 204-3 through 204-N. Each element corresponds to a cached data block cached in NV buffer pool 127-1 and includes at least the following attributes:

Home Location: Specifies the Home Location of the corresponding cached data block.

Cache Location: Storage Location of the cached data block in NV buffer pool 127-1.

Valid Flag: A flag that indicates whether or not the information in the element is valid or invalid. When valid, the information is accurate and may be relied upon for a period of time referred to as an expiration period. As shall be explained in greater detail, before removing a cached data block from NV buffer pool 127-1, the valid flag in the corresponding element for the data block is set to indicate that the element is not valid.

In order for a process on computing node 102-1 or computing node 102-2 to access NV hash table using RDMA, the process needs information about the hash table, such as the storage location of the hash table. Such information is stored in hash table configuration 109-1 and hash table configuration 109-2, which are stored on computing node 102-1 or computing node 102-2, respectively. Each of hash table configuration 109-1 and hash table configuration 109-2 contains information about NV hash table 129-1 and NV hash table 129-2. Among the information contained in hash table configuration 109-1 and hash table configuration 109-2 is the base memory address of NV hash table 129-1 and NV hash table 129-2. Other information that may be contained in hash table configuration 109-1 and hash table configuration 109-2 include the memory size of a hash table bucket.

Hash table configuration 109-1 and hash table configuration 109-2 may be generated and propagated to the computing nodes of DBMS 100, for example, as part of startup operations of DBMS 100 or a node join operation to add a database server instance as an instance to DBMS 100.

Remote Cache Read Operation

Figure 3:
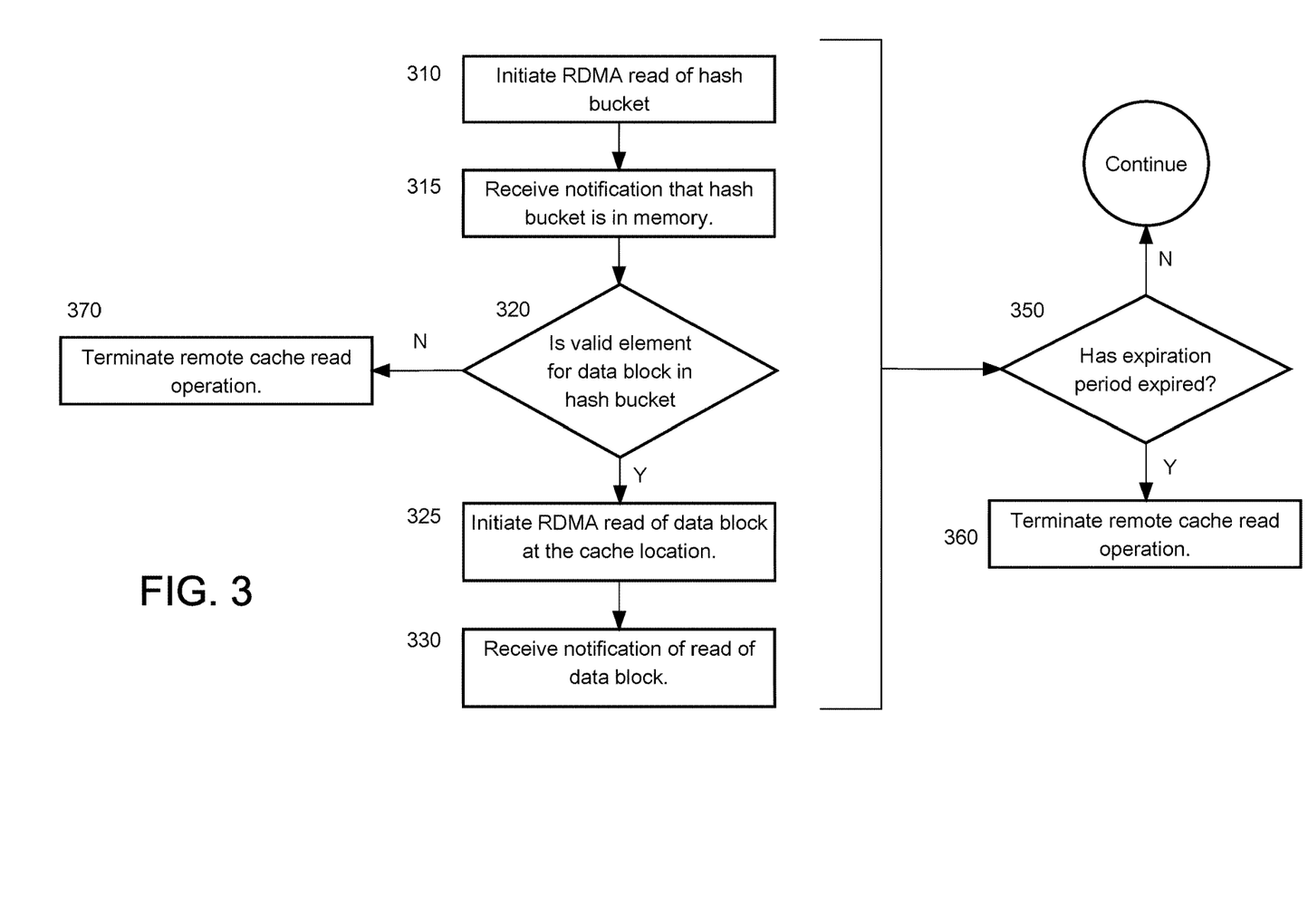
FIG. 3 illustrates a data block read operation from a cache allocated from non-volatile memory according to an embodiment of the present invention.

FIG. 3 is a flow chart depicting operations performed for a remote NV cache read operation according to an embodiment of the present invention. According to at least one embodiment, to perform a successful read operation of a data block in NV cache, an element for the data block in a NV hash table must be found and a RDMA read of the data block from NV cache must be completed within the expiration period.

A remote NV cache read operation is illustrated using DB process 105-1a on computing node 102-1 and NV hash table 129-1. DB process 105-1a is initiating a read operation to read a data block. Using a storage service, DB process 105-1a has determined the home location for the data block.

Having determined the home location, DB process 105-1a determines the hash table bucket for the data block within NV hash table 129-1. The hash table bucket is determined by applying a hash function for NV hash table 129-1 to the home location. By applying the hash function, DB process 105-1a determines that hash table bucket 202-1 would contain an element for the data block, if any.

Referring to FIG. 3, at 310, DB process 105-1a initiates an RDMA read of the hash table bucket. In an embodiment, the RDMA read is for the entirety of the hash table bucket. Initiating the RDMA read requires the base memory address of NV hash table 129-1 and target memory address to which to write the hash table bucket to local memory. DB process 105-1a determines the base memory address of the NV hash table 129-1 by accessing hash table configuration 109-1. Given the hash table base address of NV hash table 129-1, and the hash table bucket size, DB process 105-1a determines the base memory address of the hash table bucket.

At 315, DB process 105-1a receives notification that the hash table bucket has been written to the target memory address.

At 320, DB process 105-1a determines whether there is a valid element in the hash table bucket 202-1 for the data block. DB process 105-1a reads one or more elements in hash table bucket 202-1 to determine whether the home location in an element matches that of the data block and whether the valid flag in the element specifies that the element is valid.

If a valid element with a matching home location is not found, then at 370, the NV cache read operation is terminated. DB process 105-1a may request the data block by transmitting a request to storage process 125-1a. Storage process 125-1a may return the requested data block, which may entail read staging the data block on storage cell 122-1 before transmitting the data blocks over network 101 to computing node 102-1.

If a matching valid element for the data block has been found in the hash table bucket, then at 325, DB process 105-1a initiates an RDMA read of the data block at the cache location specified on the matching element.

At 330, DB process 105-1a receives notification that the data block has been written to the target address.

While performing the NV cache read operation, at 350 DB process 105-1a determines whether the expiration period has expired. If yes, the NV cache read operation is aborted. Otherwise, the NV cache read operation continues. The determination and possible consequent termination may be undertaken at various stages of the NV cache read operation and at multiple times. For example, at 315, when the notification that the hash table bucket has been written is received, DB process 105-1a determines whether the NV cache read operation has not been completed within the expiration period, and if not, terminates the NV cache read operation. Then at 325, when the notification has been received that the data block has been written, DB process 105-1a determines whether the NV cache read operation has been completed within the expiration period, and if not, terminates the NV cache read operation.

As mentioned earlier, in step 310, an entire hash bucket is read in an RDMA read. A single RDMA read has a certain latency that does not vary given the range of memory sizes that may be used to store a hash bucket. It is therefore advantageous to reduce the number RDMA reads needed to get an entire hash bucket. For at least this reason, a hash bucket is stored contiguously (within an address space) within NV RAM in order to read the hash bucket in an RDMA read. Thus, storing a hash bucket contiguously as an array of elements enables reading an entire hash bucket in a RDMA read. If on the other hand, a hash bucket is stored non-contiguously in memory as, for example, a linked listed of elements, separate multiple RDMA read requests might be needed to read an entire or even a portion of a hash bucket.

Removal of Data Block from NV Cache

Figure 4:
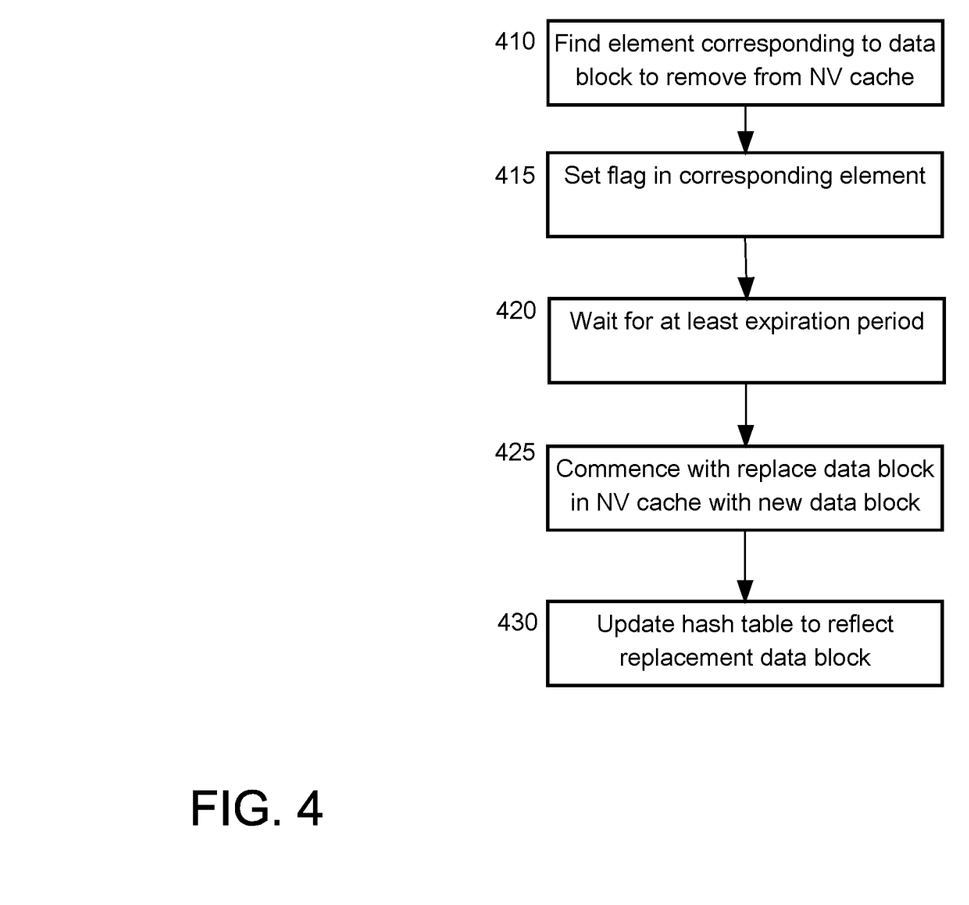
FIG. 4 illustrates primary and secondary storage locations for mirroring according to an embodiment of the present invention.

FIG. 4 is a flowchart depicting operations performed to remove a data block from a NV cache and to replace the data block with a replacement data block. Data block removal is illustrated using NV hash table 129-1 and cache manager 125-1b. Cache manager 125-1b is performing data block removal as part of a cache management operation, after having identified a data block as the "victim" for removal for replacement by a replacement data block.

Referring to FIG. 4, at 410, cache manager 125-1b finds the element corresponding to the data block to remove from NV hash table 129-1. Cache manager 125-1b begins this operation by determining the hash table bucket for the data block within NV hash table 129-1. The hash table bucket is determined by applying the hash function for NV hash table 129-1 to the home location of the data block. By applying the hash function, cache manager 125-1b determines that an element for the data block would be found in hash table bucket 202-1. Cache manager 125-1b reads elements in hash table bucket 202-1 until the corresponding element with the matching home location is found.

At 415, cache manager 125-1b sets the valid flag in the element for the data block.

At 420, cache manager 125-1b waits for a period of time that is at least as great as the expiration period. Any process that had previously read the valid flag and is relying on the validity of the valid flag will have ceased to rely on the validity of the valid flag by the time cache manager 125-1b has waited for the expiration periodtime.

At 425, cache manager 125-1*b* removes the data block from the NV buffer pool 127-1, overwriting the data block with the replacement data block at the cache location specified in the element.

At 430, cache manager 125-1*b* updates hash table 129-1 to reflect the addition of the replacement data block to NV buffer pool 127-1. Such updating includes applying the hash function for NV hash table 129-1 to the home location of the replacement data block to determine the hash table bucket corresponding to the data block. An available element in the hash table bucket is found for the replacement data block, an available element being either an element having valid flag indicating invalidity or element not being used for any data block. The available element is updated with the home location of the replacement data block and the cache location of the replacement data block in NV buffer pool 127-1, the valid flag of the element is set to valid.

Embodiments of the present invention have been illustrated using computing elements or computing nodes of a DBMS that retrieve data blocks from NV caches using RDMA. However, the present invention is not so limited. An embodiment of the present invention may implemented on any set of computing elements or computing nodes interconnected by an RDMA enabled network and that caches data blocks in NV caches accessible via the network.

Memory Overview

Because embodiments of the invention involve a novel use of a non-volatile RAM, a description of memory is pertinent and useful. As used herein, "non-volatile" refers to a characteristic of a memory that retains data in the absence of any form of electrical power, including external or battery backup. Examples of non-volatile memory include e-prom memory, flash memory, and disk memory. Non-volatile memory does not include volatile memory for which power is retained by a battery backup in the absence of another external power source. For example, volatile memory coupled to a board with an embedded battery-backup is not non-volatile memory, because without the power provided by a battery, the volatile memory does not retain data.

Byte-addressable memory is distinguishable from block-addressable memory. A byte is eight bits and is the minimum amount of data that may be addressed, retrieved from memory, or written to in byte-addressable memory. Thus, to manipulate a bit in a byte, a byte containing the bit must be fetched to a register of processor executing a machine instruction that references the byte (or word containing the byte) and manipulated according to the machine instruction or another machine instruction.

In contrast, the minimum size for a unit of block-addressable memory is a data block. A data block comprises multiple bytes and multiple words and cannot be entirely stored within a register of a processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

DBMS Overview

A DBMS manages one or more databases. A DBMS may comprise one or more database servers referred to herein as database server instances. A database comprises database data and a database dictionary that are stored on a persistent memory mechanism. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server instance of a DBMS by submitting to the database server commands that cause the database server instance to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance." A database server may comprise multiple database server instances, some or all of which are running on separate computer elements.

Database processes that comprise a database server run under the control of the database server (i.e. can be created or terminated by the database server) and perform various database server functions. Such processes are referred to herein as database processes. Database processors include listeners, garbage collectors, log writers, processes for database sessions for executing database commands issued by database clients (including processes executing within shared sessions), and recovery processes.

A database process may comprise state objects that indicate state information for the process and allows the DBMS to manage and track the process. A typical database thread may also comprise a state object. A state object is a resource that is visible to the DBMS and indicates to the DBMS the state of the process. For example, a state object may indicate whether a process is free, unavailable, or failed. Thus, the DBMS can use the state object to determine how many processes are running in the database system, which ones are available, and clean up failed processes.

In an embodiment, the DBMS comprises a resource manager, which handles database processes for the database system. The resource manager may be a background daemon, a database component, software module, or some combination thereof. The resource manager may monitor database instance(s) and track processor and I/O resources across database processes. In an embodiment, the resource manager is a process scheduler that interrupts, de-schedules, schedules, or otherwise controls when database processes may run.

In an embodiment, state objects are used by the resource manager to track the current state of database processes. As used herein, a state can include information regarding a database process, login credentials for a database session, current database transactions, and resources held by a process or thread. Examples of state objects include process, session, and call state objects. Process state objects keep a process' information, attributes (such as dead, system process, fatal system process, cleanup process, shared server, and etc.), and other process structures such as a process interrupt queue.

Database Data Blocks

A data block is used by a DBMS to store one or row more database rows, or portions of rows, including one or more columns of a row. When rows are read from persistent storage, a data block containing the row is copied into a database data block buffer in RAM and/or main memory of a database server. A data block that is used to store database data maybe referred to herein as a database block. A database block usually contains multiple rows, and database block metadata describing the contents of the database block. Metadata includes control and formatting information, such as offsets to sequences of bytes representing rows or other data structures, and a list of transactions affecting a row.

A database block is referred to as being atomic because, at least in part, a database block is the smallest unit of database data a database server may request from a persistent storage device. For example, when a database server seeks a row that is stored in a data block, the data block may only read the row from a persistent storage device by reading in the entire data block.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
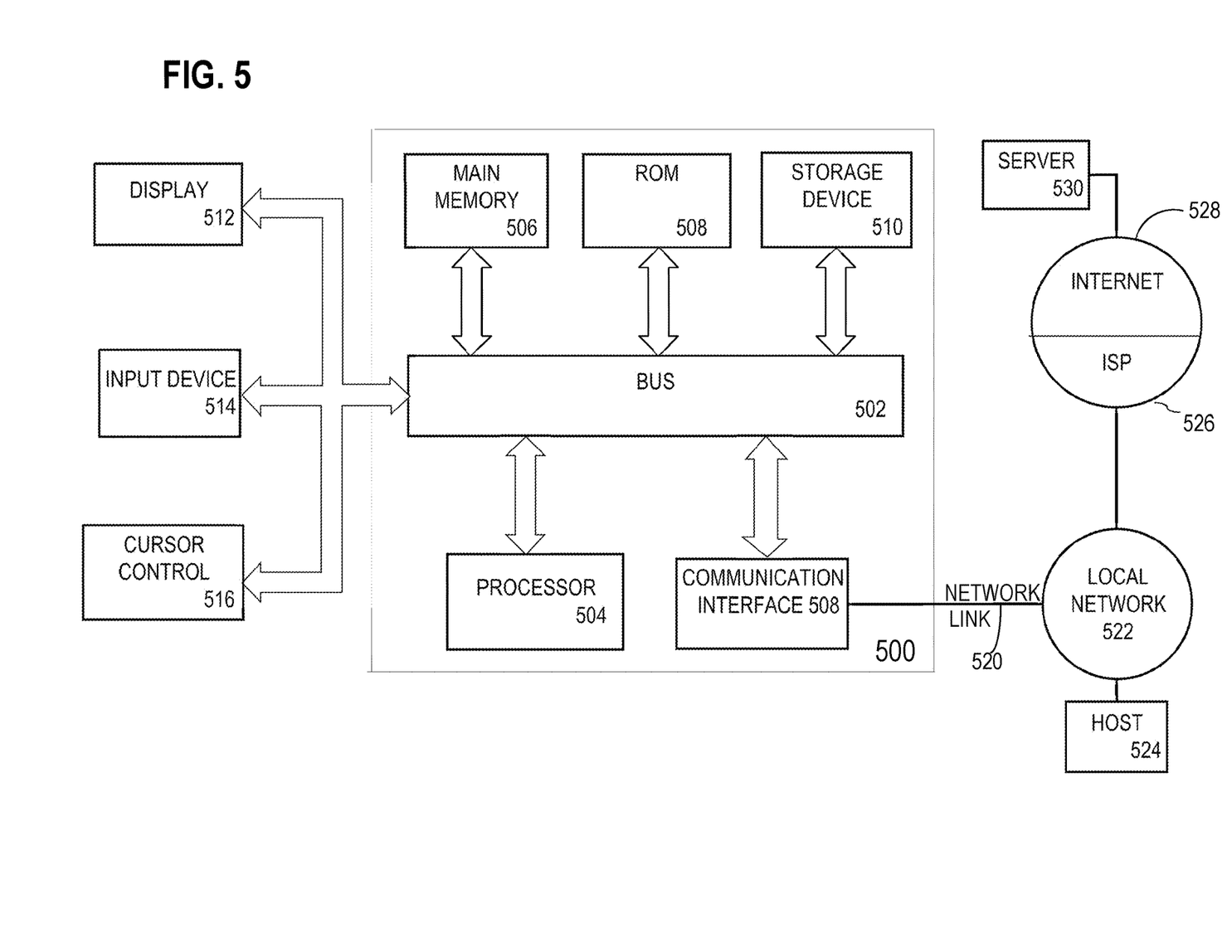
FIG. 5 is a diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 6:
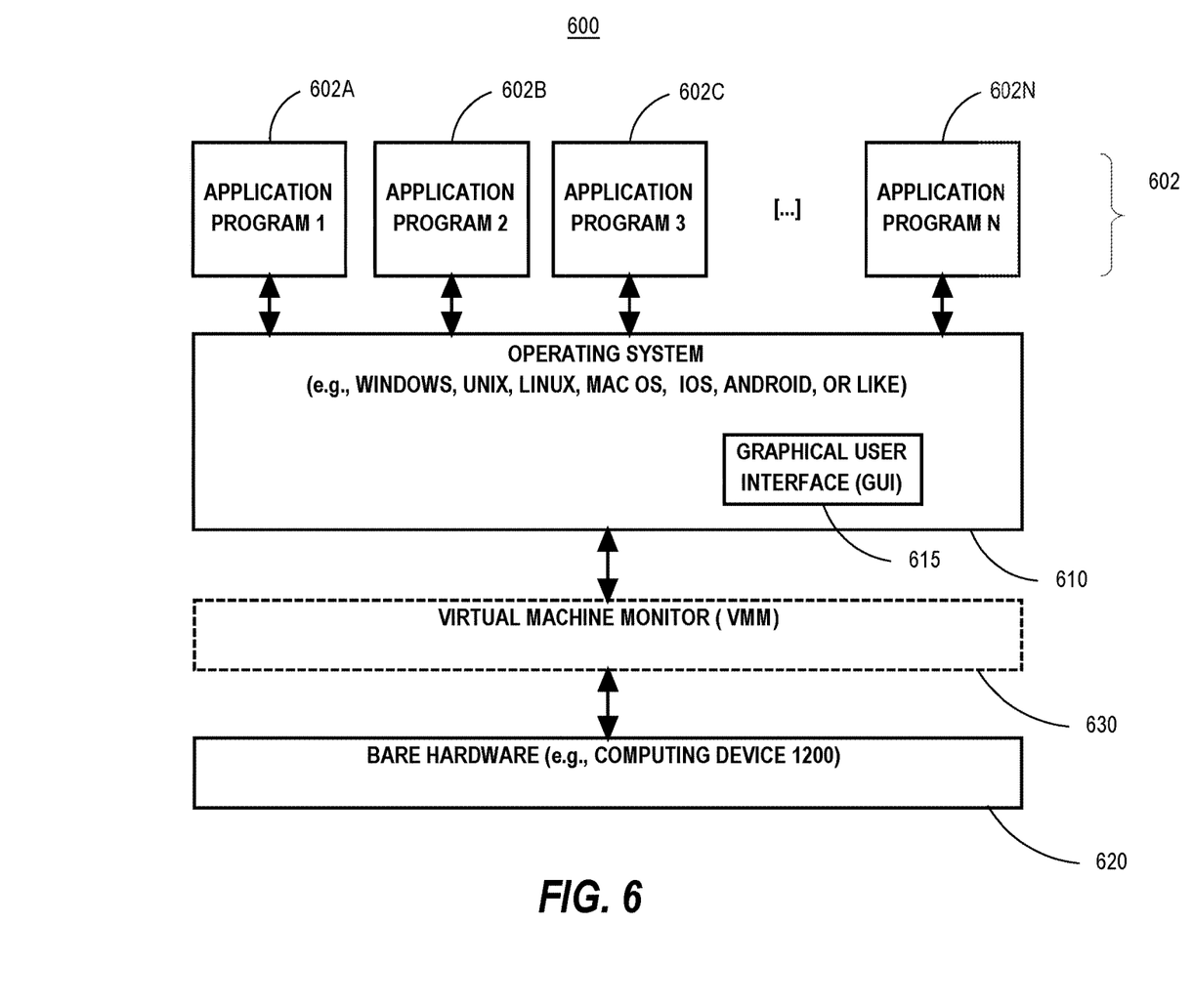
FIG. 6 is a diagram of a software system that may be employed for controlling the operation of a computer system according to an embodiment of the present invention.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
a first computing node using remote direct memory access (RDMA) to access a first hash table bucket from a hash table stored in random access memory (RAM) of a second computing node and to write the first hash table bucket to a target memory address in local memory of said first computing node;
wherein said hash table comprises a plurality of hash table buckets, each hash table bucket of said plurality of hash table buckets comprising a respective plurality of elements that correspond to a respective plurality of data blocks cached in a nonvolatile cache (NV cache) allocated from NV RAM of said second computing node, each element of said respective plurality of elements specifying both a home location in primary persistent storage and a cache location within said NV cache of a data block of said respective plurality of data blocks;
in response to a notification that the first hash table bucket has been written to said target memory address:
reading one or more elements from said first hash table bucket,
determining that a first element of said one or more elements from said first hash table bucket corresponds to a first data block stored at a particular cache location within said NV cache, wherein said determining that a first element in said first hash table bucket corresponds to a first data block includes determining that a home location of said first data block matches a home location specified by said first element,
determining that said first element includes a flag indicating that said first element is valid;
in response to at least (a) determining that said first element corresponds to said first data block and (b) determining that said first element includes said flag indicating that said first element is valid, said first computing node reading using RDMA at least a portion of said first data block from said particular cache location in said NV cache;

said second computing node selecting said first data block for replacement within said NV cache;
in response to selecting said first data block for replacement:
said second computing node setting the flag in said first element to specify that said first element is not valid; and
after setting the flag, said second computing node waiting at least an expiration period before replacing said first data block in said NV cache.

2. The method of claim 1, further including:
while said first computing node reading using RDMA at least a portion of said first data block, determining that said expiration period has expired;
in response to determining that said expiration period has expired, ceasing to read said first data block.

3. The method of claim 1, wherein for each hash table bucket of said plurality of hash table buckets, each element of said respective plurality of elements is stored as an array element in an array, said array being stored in a contiguous region of said NVRAM.

4. The method of claim 3, wherein to write the first hash table bucket to a target memory address includes writing the array in entirety at said target memory address in said local memory.

5. The method of claim 4, wherein reading one or more elements from said first hash table bucket includes reading each array element of one or more array elements of said array to determine whether a home location stored as an attribute of said each array element matches said home location of said first data block.

6. The method of claim 5, wherein said home location of said first data block is a storage location of said first data block in persistent storage of said second computing node, said NV cache being used to cache data blocks stored in said persistent storage.

7. The method of claim 1, wherein the method further includes applying a hash function to said home location of said first data block to identify said first hash table bucket as corresponding to said first data block.

8. One or more non-transitory computer-readable media storing sequences of instructions that, when executed by one or more hardware processors, cause:
a first computing node using remote direct memory access (RDMA) to access a first hash table bucket from a hash table stored in random access memory (RAM) of a second computing node and to write the first hash table bucket to a target memory address in local memory of said first computing node;
wherein said hash table comprises a plurality of hash table buckets, each hash table bucket of said plurality of hash table buckets comprising a respective plurality of elements that correspond to a respective plurality of data blocks cached in a nonvolatile cache (NV cache) allocated from NV RAM of said second computing node, each element of said respective plurality of elements specifying both a home location in primary persistent storage and a cache location within said NV cache of a data block of said respective plurality of data blocks;
in response to a notification that the first hash table bucket has been written to said target memory address:
reading one or more elements from said first hash table bucket,
determining that a first element of said one or more elements from said first hash table bucket corresponds to a first data block stored at a particular cache location within said NV cache, wherein said determining that a first element in said first hash table bucket corresponds to a first data block includes determining that a home location of said first data block matches a home location specified by said first element,
determining that said first element includes a flag indicating that said first element is valid;
in response to at least (a) determining that said first element corresponds to said first data block and (b) determining that said first element includes said flag indicating that said first element is valid, said first computing node reading using RDMA at least a portion of said first data block from said particular cache location in said NV cache;
said second computing node selecting said first data block for replacement within said NV cache;
in response to selecting said first data block for replacement:
said second computing node setting the flag in said first element to specify that said first element is not valid; and
after setting the flag, said second computing node waiting at least an expiration period before replacing said first data block in said NV cache.

9. The one or more non-transitory computer-readable media of claim 8, wherein the sequences of instructions include instructions that, when executed by said one or more hardware processors, cause:
while said first computing node reading using RDMA at least a portion of said first data block, determining that said expiration period has expired;
in response to determining that said expiration period has expired, ceasing to read said first data block.

10. The one or more non-transitory computer-readable media of claim 8, wherein for each hash table bucket of said plurality of hash table buckets, each element of said respective plurality of elements is stored as an array element in an array, said array being stored in a contiguous region of said NVRAM.

11. The one or more non-transitory computer-readable media of claim 10, wherein to write the first hash table bucket to a target memory address includes writing the array in entirety at said target memory address in said local memory.

12. The one or more non-transitory computer-readable media of claim 11, wherein reading one or more elements from said first hash table bucket includes reading each array element of one or more array elements of said array to determine whether a home location stored as an attribute of said each array element matches said home location of said first data block.

13. The one or more non-transitory computer-readable media of claim 12, wherein said home location of said first data block is a storage location of said first data block in persistent storage of said second computing node, said NV cache being used to cache data blocks stored in said persistent storage.

14. The one or more non-transitory computer-readable media of claim 8, wherein the sequences of instructions include instructions that, when executed by said one or more hardware processors, cause applying a hash function to said home location of said first data block to identify said first hash table bucket as corresponding to said first data block.

* * * * *